(12) United States Patent  
Izard et al.

(10) Patent No.: US 8,615,752 B2  
(45) Date of Patent: Dec. 24, 2013

(54) SYSTEM AND METHOD FOR DETECTING SOFTWARE PATCH DEPENDENCIES

(75) Inventors: William Izard, Sydney (AU); David de Vos, Lane Cove (AU); Andreas Spanner, St. Leonards (AU)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 12/346,165

(22) Filed: Dec. 30, 2008

(65) Prior Publication Data

US 2010/0169874 A1 Jul. 1, 2010

(51) Int. Cl.  
*G06F 9/44* (2006.01)

(52) U.S. Cl.  
USPC ............ 717/169; 717/168; 717/172; 717/177

(58) Field of Classification Search  
USPC ....................... 717/101–178; 726/21; 709/223  
See application file for complete search history.

(56) References Cited

U.S. PATENT DOCUMENTS

| | | | | |
|---|---|---|---|---|
| 6,594,822 | B1 * | 7/2003 | Schweitz et al. | 717/140 |
| 7,562,356 | B2 * | 7/2009 | DeFolo | 717/169 |
| 7,765,538 | B2 * | 7/2010 | Zweifel et al. | 717/168 |
| 7,831,966 | B2 * | 11/2010 | Costanza et al. | 717/168 |
| 2002/0174422 | A1 * | 11/2002 | Kelley et al. | 717/178 |
| 2003/0163807 | A1 * | 8/2003 | Drake et al. | 717/174 |
| 2003/0218628 | A1 * | 11/2003 | Deshpande et al. | 345/738 |
| 2004/0015946 | A1 * | 1/2004 | Te'eni et al. | 717/169 |
| 2004/0088699 | A1 * | 5/2004 | Suresh | 717/174 |
| 2004/0210653 | A1 * | 10/2004 | Kanoor et al. | 709/223 |
| 2006/0048130 | A1 * | 3/2006 | Napier et al. | 717/168 |
| 2006/0064685 | A1 * | 3/2006 | DeFolo | 717/169 |
| 2006/0288341 | A1 * | 12/2006 | Wurden et al. | 717/168 |
| 2007/0106979 | A1 * | 5/2007 | Felts | 717/124 |
| 2008/0052676 | A1 * | 2/2008 | Wookey | 717/120 |
| 2009/0144716 | A1 * | 6/2009 | Felts | 717/168 |
| 2009/0222916 | A1 * | 9/2009 | Blaisdell | 726/21 |

* cited by examiner

*Primary Examiner* — Lewis A Bullock, Jr.  
*Assistant Examiner* — Francisco Aponte  
(74) *Attorney, Agent, or Firm* — Holland & Knight, LLP; Brian J. Colandreo, Esq.; Jeffrey T. Placker, Esq.

(57) ABSTRACT

This disclosure relates to software patches and, more particularly, to detecting software patch dependencies in an environment where multiple software patches may be installed. A method, computer program product, and system for detecting software patch dependencies receives one or more first lists of software code segments, including changes to the software code segments associated with one or more first software patches. A second list of software code segments that includes software code paths executed at run-time by a second software patch is received. One or more matching code segments are identified. Dependencies of the second software patch based on the one or more matching software code segments are identified. The dependencies represent software patches required by the second software patch. A list of the dependencies is generated.

18 Claims, 5 Drawing Sheets

SYSTEM AND METHOD FOR DETECTING SOFTWARE PATCH DEPENDENCIES

TECHNICAL FIELD

This disclosure relates to software patches and, more particularly, to detecting software patch dependencies in an environment where multiple software patches may be installed.

BACKGROUND

Software products that are installed in the field can become outdated or can contain bugs. Software companies will often provide software patches for their products that update the product's functionality or fix bugs found in the field. The patch is usually a software package that, when applied to the software product, modifies the installed software product in some way, but does not completely reinstall the software product. Sometimes a software product will require a series of patches that provide a series of updates or fixes. For example, a software company may provide a patch that updates a key feature of a software product. A few months later the software company may discover a security hole caused by the update, and will subsequently release another patch that closes the security hole. A software product may require many patches over the course of its product life, especially if the software product is complex or has a long product life.

Software patches may be dependent upon previously released software patches. For example, where two software patches modify one or more files, one software patch may be a pre-requisite for another software patch, meaning that the two software patches modify one or more of the same files. That is, there is an overlap between the two sets of files modified by the two patches. Pre-requisite dependencies are relatively easy to detect by the software company that produces the patch because they can be detected by comparing the files that were modified by the two patches.

Other software patch dependences, however, can be harder to detect. It is possible that the set of files modified by two software patches may be entirely different and have no overlap, but the second software patch still requires the first software patch to be installed in order to function correctly. For example, the first software patch may change a method's or function's signature, or the way a method or function works. The second patch may rely on the modification. Since the first software patch was not installed, the modification upon which the subsequent patch relies is not present in the system. Without the modification the subsequent patch may not work properly or may crash the system. In this scenario, the first patch may be referred to as a co-requisite of the second patch. The dependency may be more difficult to notice: it may not be detectable until the subsequent patch has been installed on the system, has relied on the modification which is not present, and fails to work or crashes the running system. Co-requisite software patch dependencies can be very difficult to detect by the software company that produces the patch and, if not detected, can often cause system crashes or functional failures in the field.

SUMMARY OF DISCLOSURE

In an embodiment, a method of detecting software patch dependencies includes receiving one or more first lists of software code segments that include changes to the software code segments associated with one or more first software patches. A second list of software code segments that include software code paths executed at run-time by a second software patch is received. The method identifies one or more matching software code segments that are included in at least one of the first lists and the second list. The matching software code segments may include changes associated with the first software patches and software code paths executed at run-time by the second software patch. The method identifies dependencies of the second software patch based on the one or more matching software code segments. The dependencies represent one or more of the first software patches required by the second software patch. The method also generates a list of the one or more first software patches required by the second software patch.

One or more of the following features may be included. A software patch installation package that includes the second software patch and first software patches required by the first software patch may be compiled. The one or more first software patches and/or the second software patch may be installed on a computer system. Applications may be executed that exercise substantially all run time code paths of the second software patch. Additionally, the execution of the one or more applications may include monitoring the run time code paths of the second software patch. The software code segments executed at run-time by the second patch may be recorded while the run time code paths of the second software patch are exercised. A second list of software code segments may be generated from the recorded software code segments.

Exercising substantially all of the run time code paths of the second software patch may be performed by an automated software tool or a manual test process configured to exercise the run time code paths of the second software patch. The one or more first lists of software code segments may be generated by a software source code revision tool. The second list of software code segments may be generated by a run time software code coverage tool. Changes to the software code segments made by the first software patches may include: deleting, modifying, or adding a method or function, class and/or file.

In another embodiment, a computer program product for detecting software patch dependencies resides on a computer readable medium. The instructions of the computer program product, when executed by a processor, cause the processor to perform operations including receiving one or more first lists of software code segments that include changes to the software code segments associated with one or more first software patches. A second list of software code segments that include software code paths executed at run-time by a second software patch is also received. The operations identify one or more matching software code segments that are included in at least one of the first lists and the second list. The matching software code segments may include changes associated with the first software patches and software code paths executed at run-time by the second software patch. The operations also identify dependencies of the second software patch based on the one or more matching software code segments. The dependencies represent one or more of the first software patches required by the second software patch. The operations also generate a list of the one or more first software patches required by the second software patch.

One or more of the following features may be included. A software patch installation package that includes the second software patch and first software patches required by the first software patch may be compiled. The one or more first software patches and/or the second software patch may be installed on a computer system. Applications may be executed that exercise substantially all run time code paths of the second software patch. Additionally, the execution of the one or more applications may include monitoring the run time code paths of the second software patch. The software code segments executed at run-time by the second patch may be recorded while the run time code paths of the second software patch are exercised. A second list of software code segments may be generated from the recorded software code segments.

Exercising substantially all of the run time code paths of the second software patch may be performed by an automated software tool or a manual test process configured to exercise the run time code paths of the second software patch. The one or more first lists of software code segments may be generated by a software source code revision tool. The second list of software code segments may be generated by a run time software code coverage tool. Changes to the software code segments made by software patches may include: deleting, modifying, or adding a method or function, class and/or file.

In another embodiment, a computing system includes at least one processor and at least one memory architecture coupled with the at least one processor. A first software instruction set is executed on the at least one processor and the at least one memory architecture and configured to receive one or more first lists of software code segments. The first lists of software code segments include changes to the software code segments associated with one or more first software patches. A second software instruction set is configured to receive a second list of software code segments that includes software code paths executed at run-time by a second software patch. A third software instruction set is configured to identify one or more matching software code segments that are included in at least one of the first lists and the second list. The matching software code segments include changes associated with the one or more first software patches and software code paths executed at run-time by the second software patch. A fourth software instruction set is configured to identify one or more dependencies of the second software patch based on the one or more matching software code segments. The one or more dependencies represent one or more of the first software patches required by the second software patch. And a fifth software instruction set is configured to generate a list of the one or more first software patches required by the second software patch.

One or more of the following features may be included. The computing system of claim may include a software instruction set executed on the at least one processor and the at least one memory architecture configured to compile a software patch installation package. The software patch installation package may include the second software patch and the one or more first software patches required by the second software patch. The computing system may also include: a software instruction set configured to install the one or more first software patches on a computer system; a software instruction set configured to install the second software patch on the computer system; a software instruction set configured to execute one or more applications on the computer system including exercising substantially all run time code paths of the second software patch; a software instruction set configured to monitor the execution of the one or more applications, including monitoring at least the run time code paths of the second software patch; a software instruction set configured to record the software code segments executed at run-time by the second patch during the exercising of substantially all run time code paths of the second software patch; and a software instruction set configured to generate the second list of software code segments executed at run-time from the recorded software code segments.

Exercising substantially all run time code paths of the second software patch may be performed by: an automated software test tool configured to exercise the run time code paths of the second software patch and/or a manual test process configured to exercise the run time code paths of the second software patch. One or more first lists of software code segments may be generated by a software source code revision tool. The second list of software code segments may be generated by a run time software code coverage tool. And changes to the software code segments may include: a deleted method; a modified method; an added method; a deleted class; a modified class; an added class; a deleted file; a modified file; and an added file.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
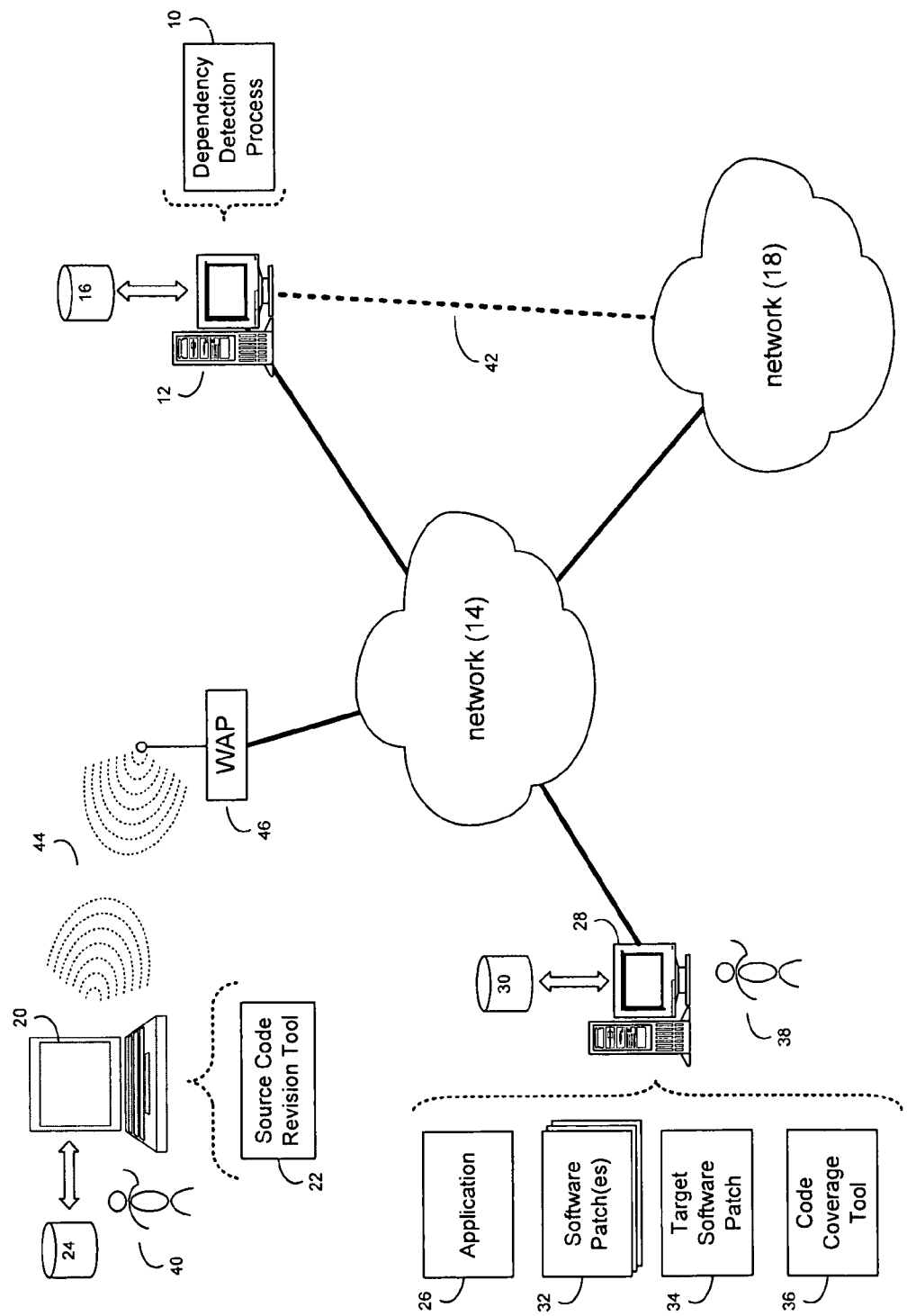
FIG. 1 is a diagrammatic view of a dependency detection process coupled to a distributed computing network.

System Overview:

FIG. 1 depicts dependency detection process 10, which may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell Netware®; or Redhat® Linux®, for example (Microsoft and Windows are trademarks of Microsoft Corporation in the United States, other countries, or both; Novell and NetWare are trademarks or registered trademarks of Novell Corporation in the United States, other countries, or both; Red Hat is a trademark or registered trademark of Red Hat Corporation in the United States, other countries, or both; and Linux is a registered trademark of Linus Torvalds in the United States, other countries, or both).

As will be discussed below in greater detail, dependency detection process 10 may receive one or more first lists of software code segments that include changes to the software code segments associated with one or more first software patches. A second list of software code segments that include software code paths executed at run-time by a second software patch may be received. Dependency detection process 10 may identify one or more matching software code segments of the first and second lists. The matching software code segments may include changes associated with the first software patches and software code paths executed at run-time by the second software patch. Dependency detection process 10 may also identify dependencies of the second software patch based on the one or more matching software code segments. The dependencies may represent one or more of the first software patches required by the second software patch. Dependency detection process 10 may also generate a list of the one or more first software patches required by the second software patch.

The instruction sets and subroutines of dependency detection process 10, which may include one or more software module, and which may be stored on storage device 16 coupled to server computer 12, may be executed by one or more processors (not shown) and one or more memory architectures (not shown) incorporated into server computer 12. Storage device 16 may include but is not limited to: a hard disk drive; a solid state drive; a tape drive; an optical drive; a RAID array; a random access memory (RAM); and a read-only memory (ROM).

The instruction sets and subroutines of dependency detection process 10 may be generated through the use of a compiler, such as the IBM® XL compiler, the Visual Studio® compiler, or an assembler, for example (IBM is a trademark or registered trademark of International Business Machines Corporation in the United States, other countries, or both; Visual Studio is a registered trademark of Microsoft Corporation in the United States, other countries, or both). The instruction set and subroutines may also be generated as scripts, such as JavaScript® scripts, or as other types of software code (Java and all Java-based trademarks and logos are of Sun Microsystems, Inc. in the United States, other countries, or both). In general, and as is known in the art, the instruction set and subroutines of dependency detection process 10 may be generated via any method of generating instruction sets and subroutines that may be executed by a processor. Laptop 20 may execute software code revision tool 22, examples of which include the ClearCase® configuration management tool (ClearCase is a trademark or registered trademark of International Business Machines in the United States, other countries, or both). Software revision tool 22 may allow an organization to track and maintain software code revisions and changes during the software development process. As will be discussed below in greater detail, software revision tool 22 may generate a list of software code changes associated with one or more software patches. Software revision tool 22 may be stored on storage device 24 coupled to laptop 20. Although shown as a client application, software revision tool 22 may also be a server application, or a client/server application executed by one or more computing devices.

Application 26 may be a software application (i.e. a software product) installed on and executed by computer 28. Application 26 may be stored on storage device 30, coupled to computer 28. Application 26 may be any type of software product that a software development company can develop, use, sell, or deploy. Various software patches that update or modify application 26 may also be installed on computer 28. For example, one or more software patches 32 and at least one target software patch 34 may be installed on computer 28. These software patches may provide various updates and fixes to application 26.

Code coverage tool 36 may also reside on storage device 30 and be executed by computer 28. Code coverage tool 36 may be a tool that monitors and measures code coverage, i.e. the degree to which the source code of a program has been tested or executed. Code coverage tool 36 may also be able to report any or all run-time code paths executed by a software application, such as application 26. For example, code coverage tool 36 may be able to report which function calls, statements, or instructions have been executed while application 26 is run. Examples of code coverage tools include, but are not limited to, the Atlassian Clover tool, the BullseyeCoverage tool, or the IBM Binary Prober tool.

Storage devices 16, 24, 30 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Various client electronic devices may be coupled to network 14. Examples of client electronic devices may include, but are not limited to: server 12, laptop 20, computer 28, a personal digital assistant (not shown), a data-enabled, cellular telephone (not shown), and a dedicated network device (not shown). Users 38, 40 may access the various tools and applications, such as dependency detection process 10, source code revision tool 22, or application 26, from any device connected to network 14 or network 18, or directly from the device on which the tool or application resides. Client electronic devices may be coupled directly to network 14, or may be indirectly coupled to network 14 through network 18. For example, server 12 may be indirectly connect to network 14 through secondary network 18, as illustrated by phantom link line 42.

The various client electronic devices may be directly or indirectly coupled to network 14 (or network 18). For example, computer 28 is shown directly coupled to network 14 via a hardwired network connection. Further, server 12 is shown directly coupled to network 14 via a hardwired network connection. Laptop 20 is shown wirelessly coupled to network 14 via wireless communication channel 44 established between laptop 20 and wireless access point (i.e., WAP) 46, which is shown directly coupled to network 14. WAP 46 may be, for example, an IEEE 802.11a, 802.11b, 802.11g, Wi-Fi, and/or Bluetooth device that is capable of establishing wireless communication channel 44 between laptop 20 and WAP 46.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 12, 20, 28 may each execute an operating system, examples of which may include but are not limited to Microsoft Windows, Redhat Linux, or a custom operating system.

Dependency Detection Process

Figure 2:
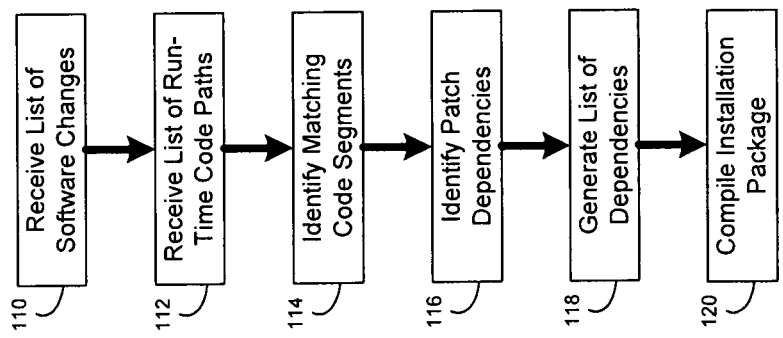
FIG. 2 is a flowchart of the dependency detection process of FIG. 1.

Referring to FIG. 1 and FIG. 2, dependency detection process 10 may receive 110 a list of software code segments. The list may include changes to the software code segments associated with one or more first software patches. Dependency detection process 10 may also receive 112 a second list of software code segments that include software code paths executed at run-time by a second software patch. Dependency detection process 10 may identify 114 one or more matching software code segments of the first and second lists. The matching software code segments may include changes associated with the first software patches, and may have been executed at run-time by the second software patch. Dependency detection process 10 may also identify 116 dependencies of the second software patch based on the one or more matching software code segments. The dependencies may represent one or more of the first software patches that are required by the second software patch. Dependency detection process 10 may also generate 118 a list of the one or more first software patches required by the second software patch. Additionally, dependency detection process 10 may compile 120 an installation package that includes the second software patch and the one or more first software patches upon which the second software patch depends.

Software patches may be used to update a software application, such as application 26. When a software patch (e.g. one or more of software patches 32) is installed, it may modify application 26, thus changing application 26 in some way. For example, the software patch may modify files, functions, classes, code, data, or other aspects of application 26 in order to effectuate the update. Often times, when a software patch is developed, the changes made by the software patch are captured by a source code revision tool, such as source code revision tool 22. Source code revision tool 22 may store all the revisions developers make to source code during development. Source code revision tool 22 may store all versions of a particular source code file, for example, and may be able to compare and analyze the changes to each version of the particular source code file. For example, if a software patch changes a particular function of application 26, source code revision tool 22 may record and keep track of the source code file where the change was made. Source code revision tool 22 may also be able to keep track of what changes were made to particular class, functions, lines of code, etc.

Source code revision tool 22 may be able to provide a list of any or all changes made by a particular software patch. If more than one software patch is developed, source code revision tool 22 may be able to provide a list of changes made by all the software patches. As will be discussed, the list may identify specific changes to software code segments made by specific software patches.

Figure 3:
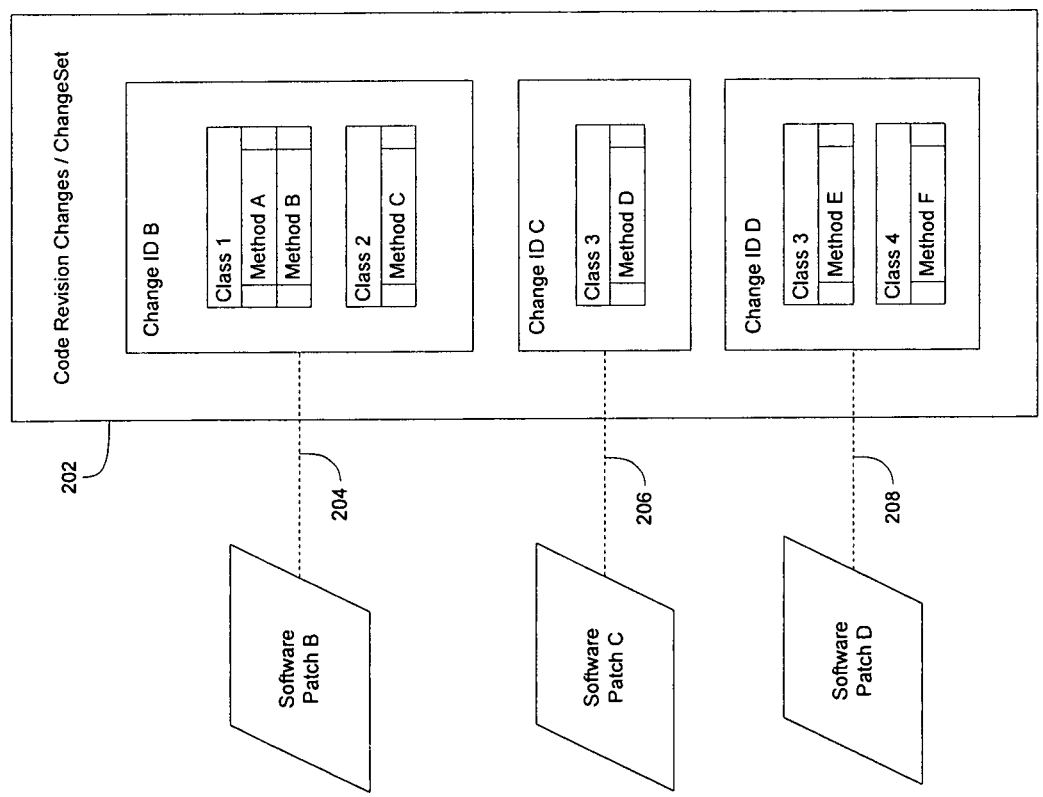
FIG. 3 is a diagrammatic view of a list of code revision changes.

Source code revision tool 22 may provide a list of software revision changes, such as changeset 202 shown in FIG. 3. Changeset 202 may be a list of source code changes made during development of one or more software patches. Accordingly, dependency detection process 10 may receive 110 changeset 202. FIG. 3 shows that changeset 202 may include changes to the source code made by software patch B, software patch C, and software patch D. The changes may be associated with a change ID. For example, changeset 202 includes change ID B, which lists software code changes associated with software patch B; change ID C, which lists code contains changes associated with software patch C, and change ID D, which lists code changes associated with software patch D.

Continuing the example, during development of software patch B, software developers may have made changes to classes and functions or methods of application 26. Particularly, in this example, the software developers may have changed methods A and B of class 1, and method C of class 2. Accordingly, change ID B includes a list of those changes associated with software patch B; as shown in FIG. 3, change ID B lists the changes to methods A and B of class 1, and method C of class 2. The association between change ID B and software patch B is shown via dotted line 204. Although this example depicts changes to methods, one skilled in the art will recognize that changeset 202 may include any changes made in software, including changes to any type of software code segment including functions or methods, classes, statements, lines or line numbers, files, etc.

Changeset 202 may include changes made during development of other software patches as well. For example, changeset 202 includes change ID C (associated with software patch C as shown by dotted line 206) which lists a change to method D of Class 3. Additionally, changeset 202 is shown to include change ID D (associated with software patch D as shown by dotted line 208), which includes changes to method E of class 3 and method F of class 4. Changeset 202 may also include changes made during the development of other software patches. Indeed, changeset 202 may list any changes made during the software development process.

In a preferred embodiment, changeset 202 may comprise XML data. The following code listing is an illustrative example of XML that corresponds to changeset 202:

```
<ChangeSet>
    <Change id="B">
        <Class name="Class 1">
            <Methods>
                <Method name="Method A"/>
                <Method name="Method B"/>
            </Methods>
        </Class>
        <Class name="Class 2">
            <Methods>
                <Method name="Method C"/>
            </Methods>
        </Class>
    </Change>
    <Change id="C">
        <Class name="Class 3">
            <Methods>
                <Method name="Method D"/>
            </Methods>
        </Class>
    </Change>
    <Change id="D">
        <Class name="Class 3">
            <Methods>
                <Method name="Method E"/>
            </Methods>
        </Class>
        <Class name="Class 4">
            <Methods>
                <Method name="Method F"/>
            </Methods>
        </Class>
    </Change>
</ChangeSet>
```

Dependency detection process 10 may also receive 112 a second list of software code segments, such as code coverage list 302. The second list (e.g. code coverage list 302) may include software code segments that are executed at run-time by a second software patch. For example, the second software patch may be a target software patch, such as target software patch 34, for which a user may wish to identify dependencies. Target software patch 34 may be installed on the same computer as application 26 (although this is not required), and may, for example, provide updates or bug fixes to application 26. A developer or user may wish to determine which software patches target software patch 34 depends upon. Accordingly, dependency detection process 10 may receive 112 a second list of software code segments (i.e., code coverage list 302).

As is known in the art, software may generally be comprised of instructions. Groups of instructions may represent higher level code elements such as functions, data structures, classes, and the like. At run time, a processor executing the groups of instructions may jump from section to section, executing various groups of instructions in varying order. For example, an IF statement, if evaluated as true, may cause the processor to execute one group of instructions and, if evaluated as false, may cause the processor to execute another group of instructions. The order of execution of these run-time code paths may not always be deterministic and may be discernable only at run time. For example, non-deterministic user input may regulate which run-time code paths are executed. As another example, object oriented programming concepts such as polymorphism, inheritance, and marshalling can obfuscate the software code paths to be executed. As such, it may be impossible to tell what version of an overridden function will be executed until the function is actually called at run-time, for example. Therefore, in order to determine the software code segments actually used by the second software patch, the second list of software code segments may include software code paths that are executed at run-time by target software patch 34.

Figure 4:
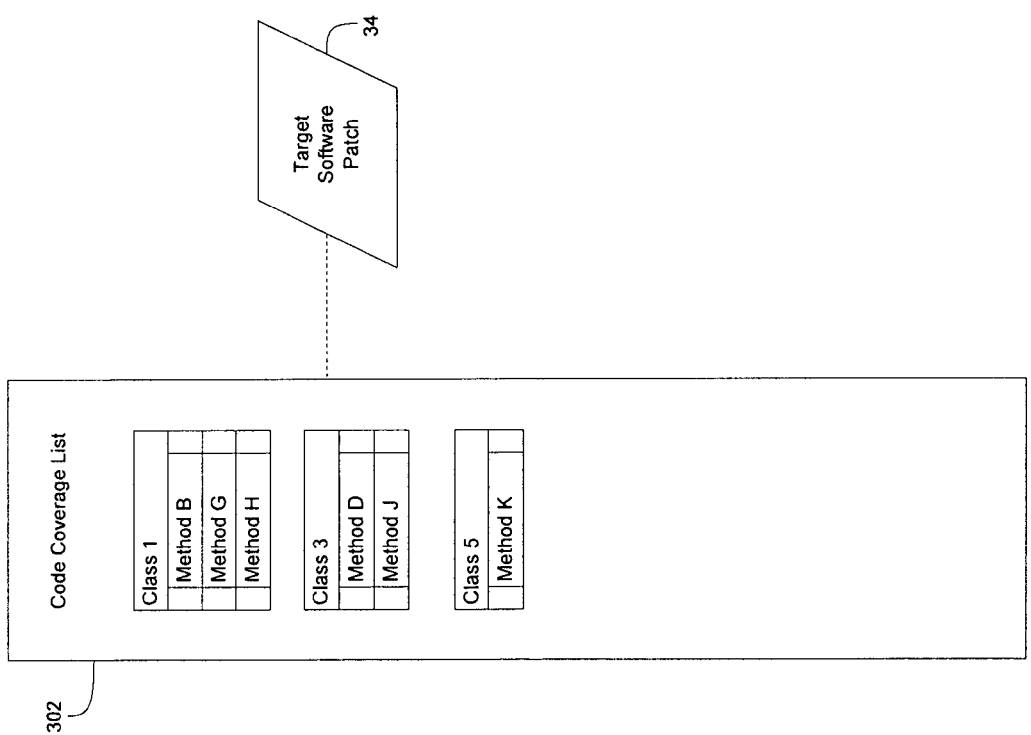
FIG. 4 is a diagrammatic view of a list of a code coverage list.

FIG. 4 depicts code coverage list 302. Code coverage list 302 may be an example of the second list, described above, that includes software code paths executed at run-time by the target software patch. As shown, code coverage list 302 may list sections of code executed at run time by target software patch 34.

In an exemplary embodiment, code coverage tool 36 may generate code coverage list 302. As discussed, code coverage tool 36 may monitor and measure code coverage, i.e. the degree to which the source code of a program has been tested or executed. Code coverage tool 36 may also be able to report any or all run-time code paths executed by a software application, such as application 26, and/or a software patch, such as target software patch 34.

One way for code coverage tool 36 to report the run-time code paths of target software patch 34 may be to install target software patch 34, run software patch 34 (or run application 26 with target software patch 34 installed), and exercise substantially all of the functionality of target software patch 34 while code coverage tool 36 is actively monitoring target software patch 34 (or application 26). Exercising the functionality of target software patch 34 may help to ensure that all the run-time code paths of target software patch 34 have been executed. If the run-time code paths of target software patch 34 are executed while code coverage tool 36 is running, then code coverage tool 36 may be able to provide a list of the run-time code paths executed by target software patch 34.

Various techniques may be used to exercise the functionality of target software patch 34. For example, user 38 may install target software patch 34 and manually perform a test process that exercises the functionality of target software patch 34. Software patches may often be minor updates that can be tested relatively quickly with a manual test. As an example, if target software patch 34 updates an error message of application 26, user 38 may manually perform the operation that invokes the error message, thus exercising the functionality of target software patch 34. Alternatively, an automated test process may automatically invoke the error message, thus exercising the functionality of target software patch 34. As is known in the art, various test programs and test harnesses may be used to automate testing. These test programs and test harnesses may be off the shelf products, or may be custom-built tools. Although the example above describes a relatively simple testing scenario, one skilled in the art will recognize that more complex testing scenarios may be used to exercise target software patches (e.g. target software patch 34) that contain more complex functionality.

As noted, code coverage tool 36 may monitor the run-time code paths that are executed while target software patch 34 is exercised. During, or upon completion of the execution, code coverage tool 36 may provide a list that includes the software code segments executed at run-time by target software patch 34. The list may be received by dependency detection process 10. Code coverage list 302 in FIG. 4 is an example of a list that may be provided by code coverage tool 36. As shown, code coverage list 302 may list methods and classes executed at run time by target software patch 34. Code coverage list 302 lists method B, method G, and method H of class 1; method D and method J of class 3; and method K of class 5. In this example, these methods represent code paths executed at run time by target software patch 34, and reported by code coverage tool 36. Although code coverage list 302 lists methods in this example, one skilled in the art will recognize that code coverage list 302 may list any type of software code segment, including functions or methods, classes, statements, lines or line numbers, files, etc.

In an exemplary embodiment, code coverage list 302 may include XML code that lists the run-time code paths. The following XML code listing is an illustrative example of XML that corresponds to code coverage list 302 shown in FIG. 4:

```
<CodeCoverage>
    <Class name="Class 1">
        <Methods>
            <Method name="Method B"/>
            <Method name="Method G"/>
            <Method name="Method H"/>
        </Methods>
    </Class>
    <Class name="Class 3">
        <Methods>
            <Method name="Method D"/>
            <Method name="Method J"/>
        </Methods>
    </Class>
    <Class name="Class 5">
        <Methods>
            <Method name="Method K"/>
        </Methods>
    </Class>
</CodeCoverage>
```

Figure 5:
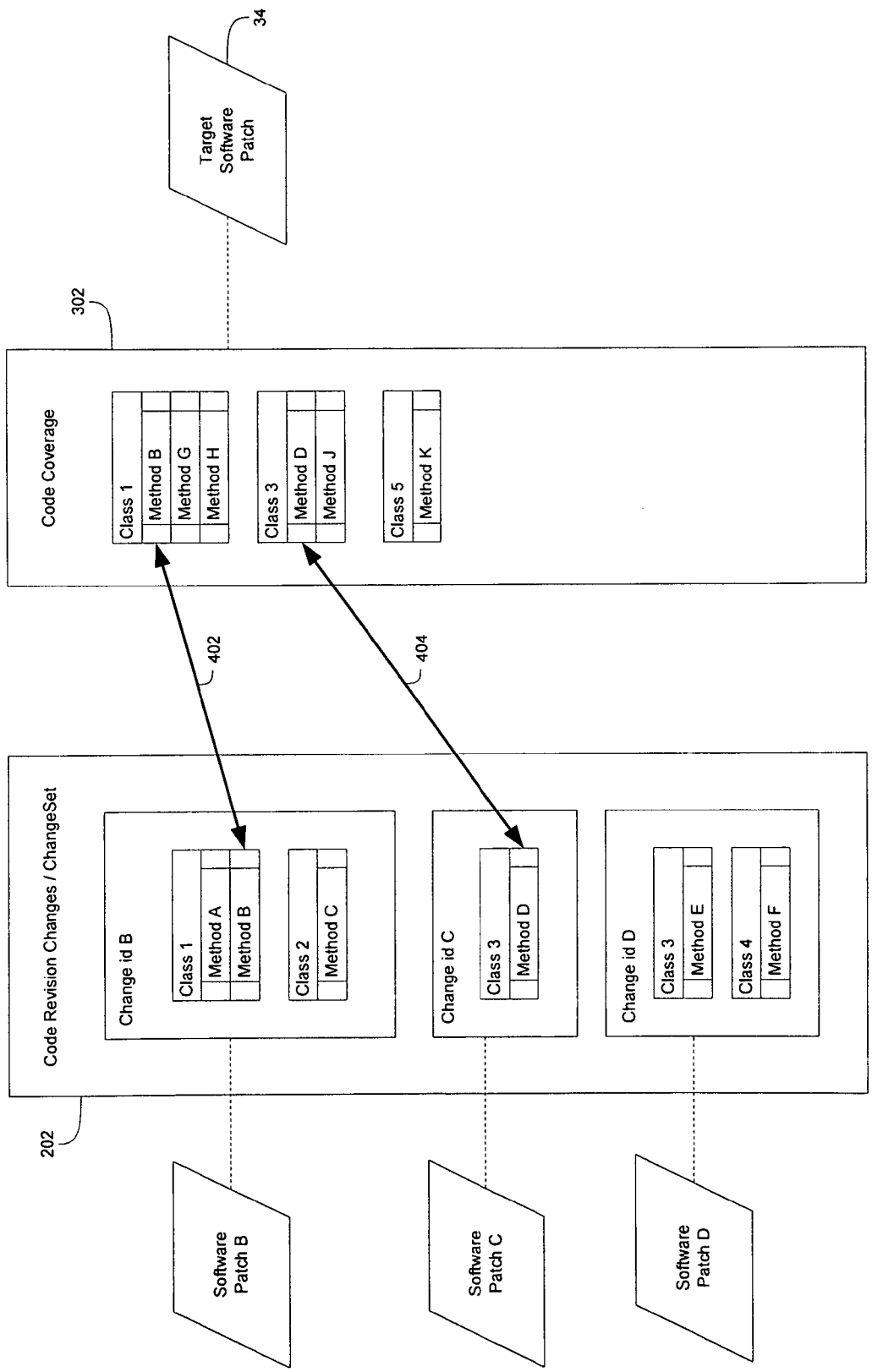
FIG. 5 is a diagrammatic view of a list of code revision changes, a code coverage list, and software patch dependencies.

Dependency detection process 10 may identify 114 matching software code segments that are included in the list of source code changes (e.g. changeset 202) and the list of code segments executed at run-time (e.g. code coverage list 302). Referring to FIG. 5, some of the code segments listed in code coverage list 302 may match the code segments listed in changeset 202. For example, method B of class 1 is listed in both changeset 202 and code coverage list 302, as illustrated by line 402. Similarly, method D of class 3 shows up in both lists, as illustrated by line 404. As discussed above, the code segments listed in code coverage list 302 may represent code segments executed at run time by target software patch 34, and the code segments listed in changeset 202 may represent code segments modified by other software patches, such as software patches B, C, and D.

Target software patch 34 may rely or depend upon code changes associated with other software patches. For example, if a software patch (i.e. software patch B, C, or D) modifies a code segment, and if that same code segment is executed at run-time by target software patch 34, then target software patch 34 may depend or rely upon the modified code segment. If target software patch 34 is installed on a computer that does not have the modified code segment, then software patch 34 may not work properly and may cause an error (e.g. a software crash) in a system (such as computer 28) or an application (such as application 26), for example. The example in FIG. 5 shows that method B is changed by software patch B, and that method D is changed by software patch C. The example also shows that method B and method D are both executed at run-time by target software patch 34. Therefore, target software patch 34 may, potentially, depend upon the change to method B made by software patch B and the change to method D made by software patch C:

Dependency detection process 10 may identify 116 dependencies of target software patch 34 based on the matching software code segments of changeset 202 and code coverage list 302. Based on the methods that appear in both lists (namely Method B and Method D), dependency detection process 10 may identify 116 software patch B and software patch C as dependencies of target software patch 34. However, if code segments of changset 202 and code coverage list 302 do not match, then a dependency may not exist. In this example, the software code changes associated with software patch D do not match any of the run time code paths associated with target software patch 34. Accordingly, software patch D may not be a dependency of target software patch 34, and may not be identified as such by dependency detection process 10.

When dependencies have been identified 116, dependency detection process 10 may generate 118 a list of the dependencies. As stated in the example, target software patch 34 may depend upon software patch B and software patch C, but not software patch D. Accordingly, the generated list of dependencies may include software patch B and software patch C, but not software patch D. In an exemplary embodiment, the generated list of dependencies may be an XML list. The following XML code illustrates a list that may be generated by dependency detection process 10:

```
<Dependencies>
    <Dependency id="B"/>
    <Dependency id="C"/>
</Dependencies>
```

Additionally, dependency detection process 10 may compile 120 a software patch installation package that includes the target software patch (i.e. target software patch 34) and any software patch upon which the target software patch depends (i.e. software patch B and software patch C).

The methods and systems described may be used in various ways. For example, they may be used to provide a more robust software patch installation package to customers that includes not only the target software patch, but any software patches upon which the target software patch depends. Including dependent software patches may reduce the risk that target software patch 34 will cause errors when installed on systems in the field. Additionally, the methods and systems may be used during development of target software patch 34 to help software developers understand which software patches are dependencies of target software patch 34.

A number of implementations have been described. Nevertheless, it will be understood that various modifications may be made. Accordingly, other implementations are within the scope of the following claims.

What is claimed is:

1. A method of detecting software patch dependencies comprising:
   receiving one or more first lists of software code segments that include changes to the software code segments associated with one or more first software patches;
   receiving a second list of software code segments that includes software code paths executed at run-time by a second software patch, wherein receiving the second list includes:
   monitoring, by a code coverage tool, execution of the software code paths of the second software patch at run-time;
   measuring, by the code coverage tool, the degree to which the software code paths of the second software patch have been tested or executed at run-time;
   reporting the software code paths executed by the second software patch at run- time; wherein said reporting includes which functions calls, statements or instructions have been executed during run-time; and
   identifying the software code segments of the second software patch that are executed at run time;
   identifying one or more matching software code segments that are included in at least one of the first lists and the second list, where the matching software code segments include changes associated with the one or more first software patches and software code paths executed at run-time by the second software patch;
   identifying one or more dependencies of the second software patch based on the one or more matching software code segments, where the one or more dependencies represent one or more of the first software patches required by the second software patch; and generating a list of the one or more first software patches required by the second software patch; and
   compiling a software patch installation package that includes the second software patch and the one or more first software patches required by the second software patch.

2. The method of claim 1 further comprising:
   installing the one or more first software patches on a computer system;
   installing the second software patch on the computer system;
   executing one or more applications on the computer system including exercising substantially all run time code paths of the second software patch;
   monitoring the execution of the one or more applications, including monitoring at least the run time code paths of the second software patch;
   recording the software code segments executed at run-time by the second patch during the exercising of substantially all run time code paths of the second software patch; and
   generating the second list of software code segments executed at run-time from the recorded software code segments.

3. The method of claim 2 wherein the exercising of substantially all run time code paths of the second software patch is performed by one or more of:
   an automated software test tool configured to exercise the run time code paths of the second software patch; and
   a manual test process configured to exercise the run time code paths of the second software patch.

4. The method of claim 1 wherein the one or more first lists of software code segments are generated by a software source code revision tool.

5. The method of claim 1 wherein the second list of software code segments is generated by a run time software code coverage tool.

6. The method of claim 1 wherein the changes to the software code segments include one or more of:
   a deleted method;
   a modified method;
   an added method;
   a deleted class;
   a modified class;

an added class;
a deleted file;
a modified file; and
an added file.

7. A computer program product for detecting software patch dependencies, residing on a non-transitory computer readable medium, having a plurality of instructions stored thereon, which, when executed by a processor, cause the processor to perform operations comprising:
receiving one or more first lists of software code segments that include changes to the software code segments associated with one or more first software patches;
receiving a second list of software code segments that includes software code paths executed at run-time by a second software patch, wherein receiving the second list includes:
monitoring, by a code coverage tool, execution of the software code paths of the second software patch at run-time;
measuring, by the code coverage tool, the degree to which the software code paths of the second software patch have been tested or executed at run-time;
reporting the software code paths executed by the second software patch at run-time; wherein said reporting includes which functions calls, statements or instructions have been executed during run-time; and
identifying the software code segments of the second software patch that are executed at run time;
identifying one or more matching software code segments that are included in at least one of the first lists and the second list, where the matching software code segments include changes associated with the one or more first software patches and software code paths executed at run- time by the second software patch;
identifying one or more dependencies of the second software patch based on the one or more matching software code segments, where the one or more dependencies represent one or more of the first software patches required by the second software patch; and
generating a list of the one or more first software patches required by the second software patch; and
compiling a software patch installation package that includes the second software patch and the one or more first software patches required by the second software patch.

8. The computer program product of claim 7 wherein the operations further comprise:
installing the one or more first software patches on a computer system;
installing the second software patch on the computer system;
executing one or more applications on the computer system including exercising substantially all run time code paths of the second software patch;
monitoring the execution of the one or more applications, including monitoring at least the run time code paths of the second software patch;
recording the software code segments executed at run-time by the second patch during the exercising of substantially all run time code paths of the second software patch; and
generating the second list of software code segments executed at run-time from the recorded software code segments.

9. The computer program product of claim 8 wherein the exercising of substantially all run time code paths of the second software patch is performed by one or more of:
an automated software test tool configured to exercise the run time code paths of the second software patch; and
a manual test process configured to exercise the run time code paths of the second software patch.

10. The computer program product of claim 7 wherein the one or more first lists of software code segments are generated by a software source code revision tool.

11. The computer program product of claim 7 wherein the second list of software code segments is generated by a run time software code coverage tool.

12. The computer program product of claim 7 wherein the changes to the software code segments include one or more of:
a deleted method;
a modified method;
an added method; a deleted class;
a modified class;
an added class;
a deleted file;
a modified file; and
an added file.

13. A computing system comprising:
at least one processor; at least one memory architecture coupled with the at least one processor;
a first software instruction set executed on the at least one processor and the at least one memory architecture configured to receive one or more first lists of software code segments that include changes to the software code segments associated with one or more first software patches;
a second software instruction set executed on the at least one processor and the at least one memory architecture configured to receive a second list of software code segments that includes software code paths executed at run-time by a second software patch, wherein the second software instruction set is configured to monitor, by a code coverage tool, execution of the software code paths of the second software patch at run-time and measure, by the code coverage tool, the degree to which the software code paths of the second software patch have been tested or executed at run-time, and configured to report the software code paths executed by the second software patch at run-time; wherein said report includes which functions calls, statements or instructions have been executed during run-time and identify the software code segments of the second software patch that are executed at run time;
a third software instruction set executed on the at least one processor and the at least one memory architecture configured to identify one or more matching software code segments that are included in at least one of the first lists and the second list, where the matching software code segments include changes associated with the one or more first software patches and software code paths executed at run-time by the second software patch;
a fourth software instruction set executed on the at least one processor and the at least one memory architecture configured to identify one or more dependencies of the second software patch based on the one or more matching software code segments, where the one or more dependencies represent one or more of the first software patches required by the second software patch; and
a fifth software instruction set executed on the at least one processor and the at least one memory architecture configured to generate a list of the one or more first software patches required by the second software patch; and a sixth software instruction set executed on the at least one processor and the at least one memory architecture configured to compile a software patch installation package that includes the second software patch and the one or more first software patches required by the second software patch.

14. The computing system of claim 13 further comprising:
a seventh software instruction set executed on the at least one processor and the at least one memory architecture configured to install the one or more first software patches on a computer system;
an eighth software instruction set executed on the at least one processor and the at least one memory architecture configured to install the second software patch on the computer system;
a ninth software instruction set executed on the at least one processor and the at least one memory architecture configured to execute one or more applications on the computer system including exercising substantially all run time code paths of the second software patch;
a tenth software instruction set executed on the at least one processor and the at least one memory architecture configured to monitor the execution of the one or more applications, including monitoring at least the run time code paths of the second software patch;
an eleventh software instruction set executed on the at least one processor and the at least one memory architecture configured to record the software code segments executed at run-time by the second patch during the exercising of substantially all run time code paths of the second software patch; and a twelfth software instruction set executed on the at least one processor and the at least one memory architecture configured to generate the second list of software code segments executed at run-time from the recorded software code segments.

15. The computing system of claim 14 wherein the exercising of substantially all run time code paths of the second software patch is performed by one or more of:
an automated software test tool configured to exercise the run time code paths of the second software patch; and
a manual test process configured to exercise the run time code paths of the second software patch.

16. The computing system of claim 13 wherein the one or more first lists of software code segments are generated by a software source code revision tool.

17. The computing system of claim 13 wherein the second list of software code segments is generated by a run time software code coverage tool.

18. The computing system of claim 13 wherein the changes to the software code segments include one or more of:
a deleted method;
a modified method;
an added method;
a deleted class;
a modified class;
an added class;
a deleted file;
a modified file; and
an added file.

* * * * *